United States Patent [19]

Irvin

[11] Patent Number: 5,929,604
[45] Date of Patent: Jul. 27, 1999

[54] BATTERY-DISCHARGE-PROTECTION SYSTEM FOR ELECTRONIC ACCESSORIES USED IN VEHICLES CONTAINING A BATTERY

[75] Inventor: David Rand Irvin, Raleigh, N.C.

[73] Assignee: Ericsson, Inc., Research Triangle Park, N.C.

[21] Appl. No.: 08/877,930

[22] Filed: Jun. 18, 1997

[51] Int. Cl.⁶ .................................................. H02J 7/00
[52] U.S. Cl. .................. 320/136; 320/163; 320/DIG. 21
[58] Field of Search ...................... 320/136, 135, 320/134, 132, 127–130, 125, 164, 163, 162, DIG. 21; 324/427, 428; 429/90–93

[56] References Cited

U.S. PATENT DOCUMENTS

| | | | |
|---|---|---|---|
| 4,558,281 | 12/1985 | Codd et al. | 324/433 |
| 4,575,679 | 3/1986 | Chung et al. | 320/136 |
| 5,043,651 | 8/1991 | Tamura | 320/136 |
| 5,140,250 | 8/1992 | Morland | 320/136 |
| 5,159,257 | 10/1992 | Oka et al. | 320/136 |
| 5,200,688 | 4/1993 | Patino et al. | |
| 5,229,704 | 7/1993 | Knepper | 320/136 |
| 5,248,929 | 9/1993 | Burke . | |
| 5,266,880 | 11/1993 | Newland . | |
| 5,280,231 | 1/1994 | Kato et al. | |
| 5,325,041 | 6/1994 | Briggs . | |
| 5,327,068 | 7/1994 | Lendrum et al. | 320/136 |
| 5,332,958 | 7/1994 | Sloan | 320/136 |
| 5,333,176 | 7/1994 | Burke et al. | |
| 5,357,203 | 10/1994 | Landau et al. | 320/136 |
| 5,426,589 | 6/1995 | Kitagawa et al. | 320/136 |
| 5,451,881 | 9/1995 | Finger | 324/433 |
| 5,479,085 | 12/1995 | Honda et al. | |
| 5,541,489 | 7/1996 | Dunstan . | |
| 5,545,969 | 8/1996 | Hasegawa . | |
| 5,617,324 | 4/1997 | Arai et al. | 320/DIG. 21 |
| 5,644,212 | 7/1997 | Takahashi . | |
| 5,668,465 | 9/1997 | May | 320/136 |
| 5,675,236 | 10/1997 | Nakahashi | 320/136 |
| 5,691,078 | 11/1997 | Kozaki et al. | 320/DIG. 21 |
| 5,694,020 | 12/1997 | Lang et al. | 320/136 |
| 5,729,061 | 3/1998 | Narita | 320/136 |
| 5,767,778 | 6/1998 | Stone et al. | 320/136 |
| 5,789,901 | 8/1998 | Lomholt | 320/136 |
| 5,834,922 | 11/1998 | Ikawa et al. | 320/136 |
| 5,838,139 | 11/1998 | Green | 320/136 |
| 5,838,140 | 11/1998 | Rosenthal | 320/136 |
| 5,870,685 | 2/1999 | Flynn | 320/136 |

FOREIGN PATENT DOCUMENTS

WO90/12427  10/1990  WIPO .

OTHER PUBLICATIONS

Stengel, Bob and Griffin, Curtis; "Batery Charger with Load Detection and Compensation"; Motorola, Inc.; vol. 24, Mar. 1995, pp. 116–117.

*Primary Examiner*—Peter S. Wong
*Assistant Examiner*—K. Shin
*Attorney, Agent, or Firm*—Rhodes, Coats & Bennett, LLP

[57] ABSTRACT

The present invention measures the energy consumption of battery-powered telephone devices to prevent the inadvertent deep discharge of a vehicle's battery by prolonged use of said devices when the vehicle is unattended. In a preferred embodiment, current to the devices is incrementally measured or estimated from a measurement of other relevant parameters. The incremental measurements of current are accumulated to produce a total current consumption indicative of the total energy consumption. At each update after an incremental measurement, the accumulated total is compared to a pre-established or adaptively determined. When the total energy consumption meets or exceeds the threshold, the power to the battery-powered telephone device is interrupted in order to conserve a sufficient amount of power to start the vehicle and to operate other peripheral systems.

32 Claims, 6 Drawing Sheets

BATTERY-DISCHARGE-PROTECTION SYSTEM FOR ELECTRONIC ACCESSORIES USED IN VEHICLES CONTAINING A BATTERY

FIELD OF THE INVENTION

The present invention relates to protection devices for vehicles and, more particularly, to a battery-discharge-protection system that is used in a vehicle containing a battery in order to conserve a minimum charge in the battery when electronic accessories, such as telephone accessories, are powered by the battery while the vehicle is unattended.

BACKGROUND OF THE INVENTION

Modern technology has progressed to a point where numerous complex electronic accessories are commonly used aboard vehicles such as passenger cars, pleasure boats, or private aircraft. These accessories include, for example, an automatic-answering cellular telephone and telephone answering machine combination. As part of their intended function, these accessories are typically used or left powered-on when the user is away from the vehicle. In such situations, these accessories depend on the vehicle's battery as their power source. Thus, with the use of these accessories comes an increased likelihood of deeply discharging the vehicle's principal battery when the vehicle is left unattended for an extended period of time. This is harmful to the battery. Moreover, since the battery is also used for starting the vehicle, a deeply discharged battery greatly inconveniences a user who is unable to start the vehicle. This problem may also be exacerbated where the battery is not fully charged to begin with, where low ambient temperature debilitates the battery, or where the battery is old and in a weakened condition.

The prior art has taught three types of remedies for this problem. The first of these remedies is simply to interrupt power to the battery-powered accessories when the ignition switch of the vehicle is in the "OFF" position. This method has the clear disadvantage of not allowing any accessories, such as an automatic-answering cellular telephone or telephone answering machine, to be used when the vehicle is unattended. This limitation clearly negates the purposes of these accessories and inconveniences the user of the vehicle.

The second type of remedy taught by the prior art involves a procedure whereby the terminal voltage of the vehicle's battery is measured and compared to a predetermined voltage threshold under which the battery would be in a deeply discharged state. When the terminal voltage of the battery is at or below this threshold voltage, the power to the accessory (s) is interrupted. However, this widely used method has the drawback that, by the time that the corrective action is taken, the battery is already in a state of substantial discharge. Thus, the user of the vehicle may still be inconvenienced where the battery is not left with sufficiently charged to start the vehicle.

The third type of remedy taught by the prior art involves the use of a timer. By this method, the power to the accessory is interrupted after a predetermined period of time following the switching of the vehicle's ignition to the "OFF" position. However, this remedy accommodates only a single level of current drawn by the battery-powered accessory(s). In other words, this method does not account for current draws which may differ between accessories or between the modes of operation of a single accessory, and which may therefore discharge the battery at different rates. For instance, a cellular telephone and answering machine may draw little current when there is no incoming call. In this state, these accessories may remain powered-on for a relatively longer period of time without deeply discharging the battery. On the other hand, a large number of incoming calls, representing a state of heavy use, would result in a substantially higher average current draw, and therefore a substantially higher battery discharge. This state would require that the power to the accessories be interrupted after a relatively shorter period of time to conserve a sufficient amount of charge in the battery. Thus, the dependence of this method on the presupposition of constant current renders this method very inefficient in light of the use-dependency of the current draw of various accessories.

There is an advantage, of course, to a method of protecting the battery of a vehicle from deep discharge due to the operation of battery-powered accessories whereby the method conserves a sufficient charge in the battery to start the vehicle while permitting such accessories to operate for the maximum time commensurate with the actual rate of energy consumption or current draw of the accessories.

A further advantage is gained where the battery-discharge-protection method adapts to external factors. These external factors may include outside ambient temperature which affects the efficiency of the battery, the age and condition of the battery, or the initial state of charge of the battery. This feature prevents the user from inadvertently bypassing the battery discharge protection method by disconnecting and reconnecting the accessory, by turning the ignition switch to the accessory position without starting the vehicle, or by not allowing the vehicle to run for a sufficient amount of time to fully recharge the battery.

SUMMARY OF THE INVENTION

The present invention measures and regulates the consumption of battery-powered accessories to prevent the inadvertent deep discharge of a vehicle's battery by prolonged use of said accessories when the vehicle is unattended. The current drawn by the accessories is measured periodically or is estimated from another measurement or from knowledge of other relevant parameters. The periodic measurements of current are accumulated to produce an estimate of battery discharge caused by the accessory. At each update of the discharge estimate, the accumulated total is compared to a pre-established or adaptively determined threshold which establishes a boundary on the extent to which the accessory is allowed to discharge the battery. When the discharge estimate meets or exceeds the threshold, the power to the battery-powered accessory is interrupted.

Power is not restored to the battery-powered accessory until the system detects a current flowing from the alternator to the battery in the vehicle, indicating that the engine is running and the battery is being recharged. At this point, turning the engine "OFF" will result in the above cycle repeating. However, the battery may not be fully recharged. The system is therefore provided with an adaptive threshold input which may detect the charge state of the battery and adjust the threshold level accordingly.

DETAILED DESCRIPTION OF THE INVENTION

Figure 1:
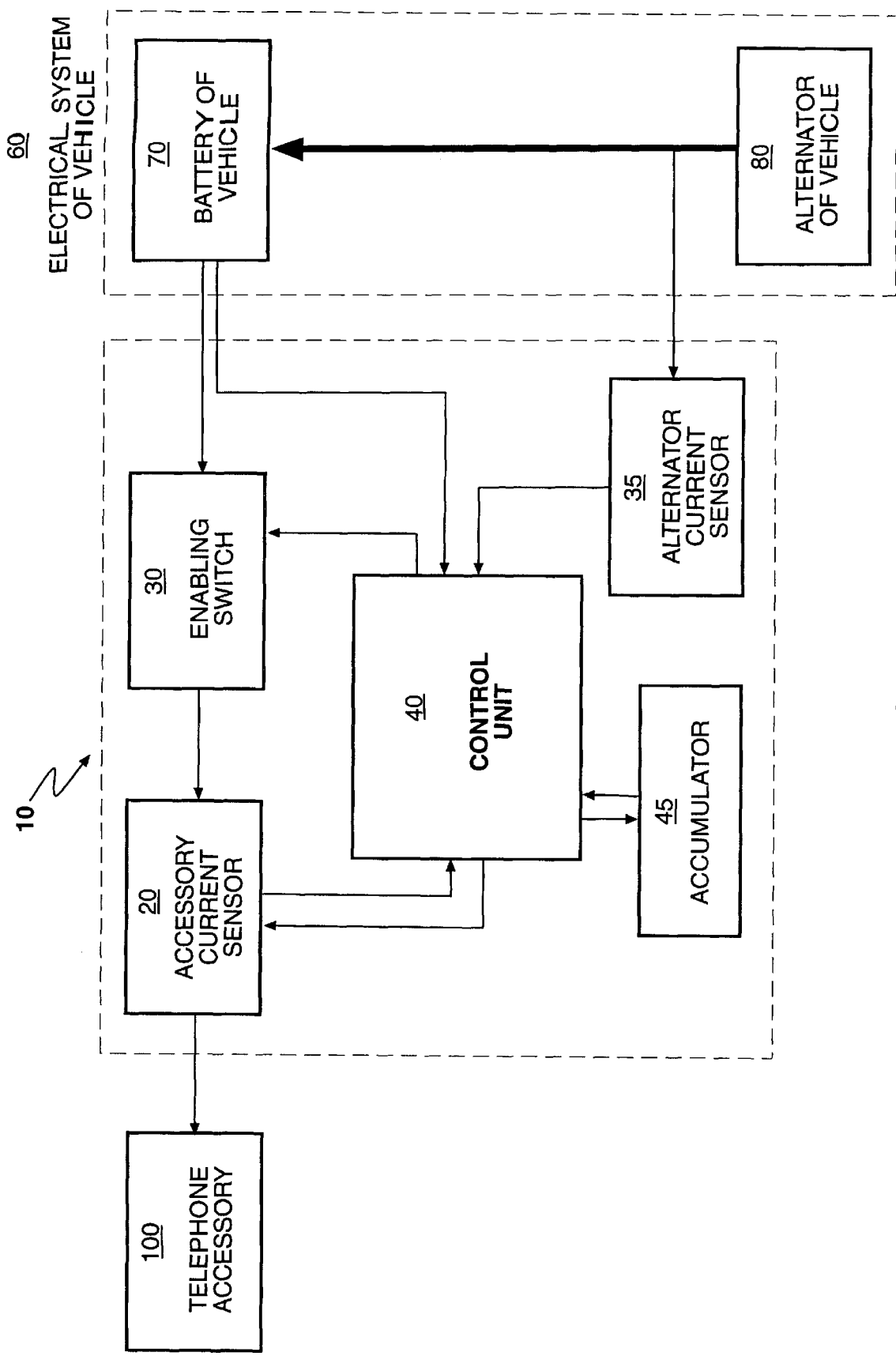
FIG. 1 is a block diagram of the battery-discharge-protection system and the electrical system of the vehicle.

Referring now to the drawings, FIG. 1 shows the basic embodiment of the battery-discharge-protection system of the present invention, indicated generally by the numeral 10. The battery-discharge-protection system 10 is particularly adapted to provide an interface between the electrical system of a vehicle, indicated by the numeral 60, and a battery-powered telephone accessory, indicated by the numeral 100. Examples of an telephone accessory 100 include a cellular telephone or a telephone answering machine. The system 10 may be provided as part of the electrical system of the vehicle, as a stand-alone adapter for a single battery-powered telephone accessory or multiple telephone accessories, or as an integral part of a particular battery-powered telephone accessory. In any case, the electrical power from the battery of the vehicle passes through the system 10 in order to power the telephone accessory 100. Essentially, the function of the battery-discharge-protection system 10 is to monitor the discharge of the battery by a telephone accessory 100 when the vehicle's alternator is not recharging the battery. When the telephone accessory 100 has discharged the battery by a certain amount, the system 10 interrupts the power to the accessory 100 so as not to allow the operation of the accessory 100 to deeply discharge the battery.

A typical example of the function of the battery-discharge-protection system is illustrated by the use of an automatic-answering cellular telephone and a telephone answering machine combination powered by a connection to the electrical system of a car. If the car is left unattended for an extended period of time, such as when the owner departs on a long business trip, the phone and answering machine combination has the potential of deeply discharging battery, thereby rendering the battery unable to start the car. When the battery-discharge-protection system is used as an interface between the car and the phone and answering machine combination, the actual amount that the battery is discharged by these accessories is estimated. The system performs this function by measuring the battery current to the telephone accessories and then computing the amount of discharge as a function of the sensed current. The system interrupts or severs power to the accessories when the accessories have discharged the battery by a predetermined amount. The intent of this power interruption scheme is to conserve a level of charge in the battery sufficient to start the car as well as operate other critical systems such as the car's alarm system, and to avoid damaging the battery by repeated deep discharge.

In a preferred embodiment, the battery-discharge-protection system 10 comprises an accessory current sensor 20, an enabling switch 30, an alternator current sensor 35, a control unit 40, and an accumulator 45. The electrical system of the vehicle 60 is further generally represented by a battery 70 and an alternator 80. The accessory current sensor 20 measures the current to the telephone accessory 100. The enabling switch 30 controls the flow of current to the telephone accessory 100. The alternator current sensor 35 senses the presence or absence of a recharging current flowing from the alternator 80 to the battery 70, indicating that the vehicle is running, and provides an input to the control unit 40. The control unit 40 monitors the battery discharge caused by the accessory 100 and controls the position of the enabling switch 30. The accumulator 45 stores an ongoing sum of samples of the current flowing to the telephone accessory 100.

The telephone accessory 100 is electrically connected in series with the accessory current sensor 20 and the enabling switch 30 to the battery 70 of the vehicle. With the enabling switch 30 in the closed position, current passes through the accessory current sensor 20 to the telephone accessory 100. Conversely, when the enabling switch 30 is in the open position, current to the telephone accessory 100 is interrupted.

Figure 2:
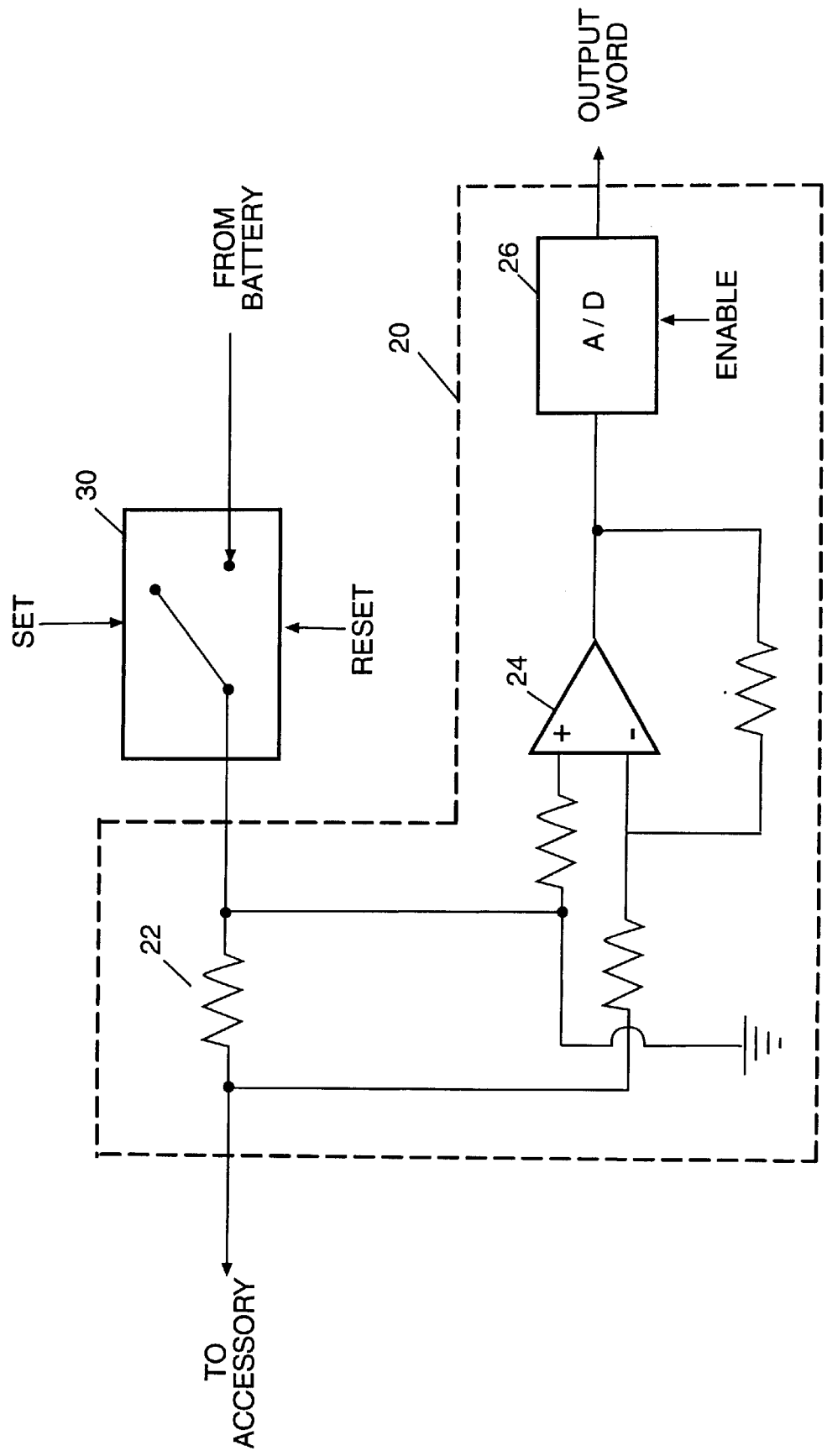
FIG. 2 is a block diagram showing one embodiment of the current sensor.

An embodiment of the accessory current sensor 20 is shown in more detail in FIG. 2. As shown in FIG. 2, the accessory current sensor 20 comprises a sensing resistor 22, a differential amplifier 24, and an analog-to-digital (A/D) converter 26. Current from the vehicle's battery 70 passes through the sensing resistor 22. Differential amplifier 24 senses the voltage drop across sensing resistor 22.

It will be readily apparent to those skilled in the art that the output of the differential amplifier 24 is directly proportional to the current flowing through the sensing resistor 22. The output of the differential amplifier 24 is passed to the analog-to-digital converter 26 which converts the output of the differential amplifier 24 at each sampling time into a digital code word which can be interpreted by the control unit 40.

Returning now to FIG. 1, the alternator current sensor 35 is connected to the output lead of the alternator 80 in the vehicle electrical system 60 in order to detect the presence of a recharging current from the alternator 80 to the battery 70. The alternator current sensor 35 is connected to the control unit 40 of the battery-discharge-protection system 10, which is powered directly from the battery 70. The control unit 40, in addition, is further connected to the accessory current sensor 20, the enabling switch 30, and the accumulator 45. The control unit 40 has the capability of generating control signals, directed both at the enabling switch 30 and the accessory current sensor 20. The enabling switch 30 is responsive to the control signals generated by the control unit 40, for either opening or closing the enabling switch 30. In general, when the alternator current sensor 35 indicates to the control unit 40 that a recharging current is present, the control unit 40 generates a set signal for the enabling switch 30 which causes the enabling switch 30 to close. Subsequently, when the alternator current sensor 35 determines that a recharging current is absent and the control unit 40 detects that the enabling switch 30 is in the closed position, the control unit 40 begins to measure the current flowing from the battery 70 to the telephone accessory 100.

The control unit 40 triggers the enable line of the analog-to-digital converter 26 within the accessory current sensor 20 to perform a measurement of the current to thee telephone accessory 100 and the accessory current sensor 20 returns the value of the sensed current to the control unit 40. The control unit 40 then adds the sampled value to the total held in the accumulator 45. Any subsequent measurements of current are performed at periodic intervals after the initial measurement and are added to the value stored in the accumulator 45. After each summation of the current measurements in the accumulator 45, the control unit 40 compares the value stored in the accumulator 45 to a predetermined threshold value. By regular comparison of the accumulated current samples to the threshold, the draw of the accessory is monitored and held in check so that the operation of the accessory does not drive the vehicle's battery in to deep discharge.

The predetermined threshold value for discharge from the battery may be determined empirically by experimentation with various vehicles, batteries, conditions, etc. On the other hand, the threshold may be established as a general value for all conditions as the difference between the full-charge capacity of a typical battery versus the worst-case demand imposed by starting a vehicle's engine. For instance, a typical battery could have a rated capacity of 60 amp-hours. Under worst-case conditions, approximately 50 amp-hours could be required from the battery to power the starter in order to start the vehicle's engine. In other words, the starter and related systems might draw 600 amps for up to 5 minutes in order to start the engine, particularly an engine that requires pre-heating by glow-plugs. Thus, the threshold could theoretically be set at 10 amp-hours. However, other systems of the vehicle, such as an alarm system, may require uninterrupted power and the threshold would have to be adjusted to compensate for the energy needed to operate these systems. Furthermore, it may be desirable to include a working margin or factor of safety in setting the threshold. Therefore, an acceptable threshold in this example could be 5 amp-hours given a factor of safety of 2. In other words, though 10 amp-hours may be discharged from the battery while leaving enough energy to start the vehicle, half of that amount or 5 amp-hours would provide a safety factor of 2. When considering that a typical telephone accessory may draw current on the order of milliamperes, this threshold would be sufficient to allow operation of the accessory for a significant period of time. In this case, the time period would be measured in days.

If the value in the accumulator 45 is less than the threshold value, the control unit 40 continues to perform current measurements at periodic intervals. Each resulting sample is added to the preceding value stored in the accumulator 45. When the value in the accumulator 45 is equal to or greater than the threshold value, the control unit 40 generates a reset signal, opening the enabling switch 30 and interrupting the supply of power to the telephone accessory 100. At the same time, the control unit 40 clears the accumulator 45 by setting the stored value to zero.

Power is restored to the telephone accessory 100 when a recharging current is detected by the control unit 40. That is, when the alternator 80 is recharging the battery 70 or the engine of the vehicle is running, the alternator current sensor 35 indicates to the control unit 40 that a recharging current is present. The control unit 40 then generates a set signal, closing the enabling switch 30 and restoring power to the telephone accessory 100.

Figure 3:
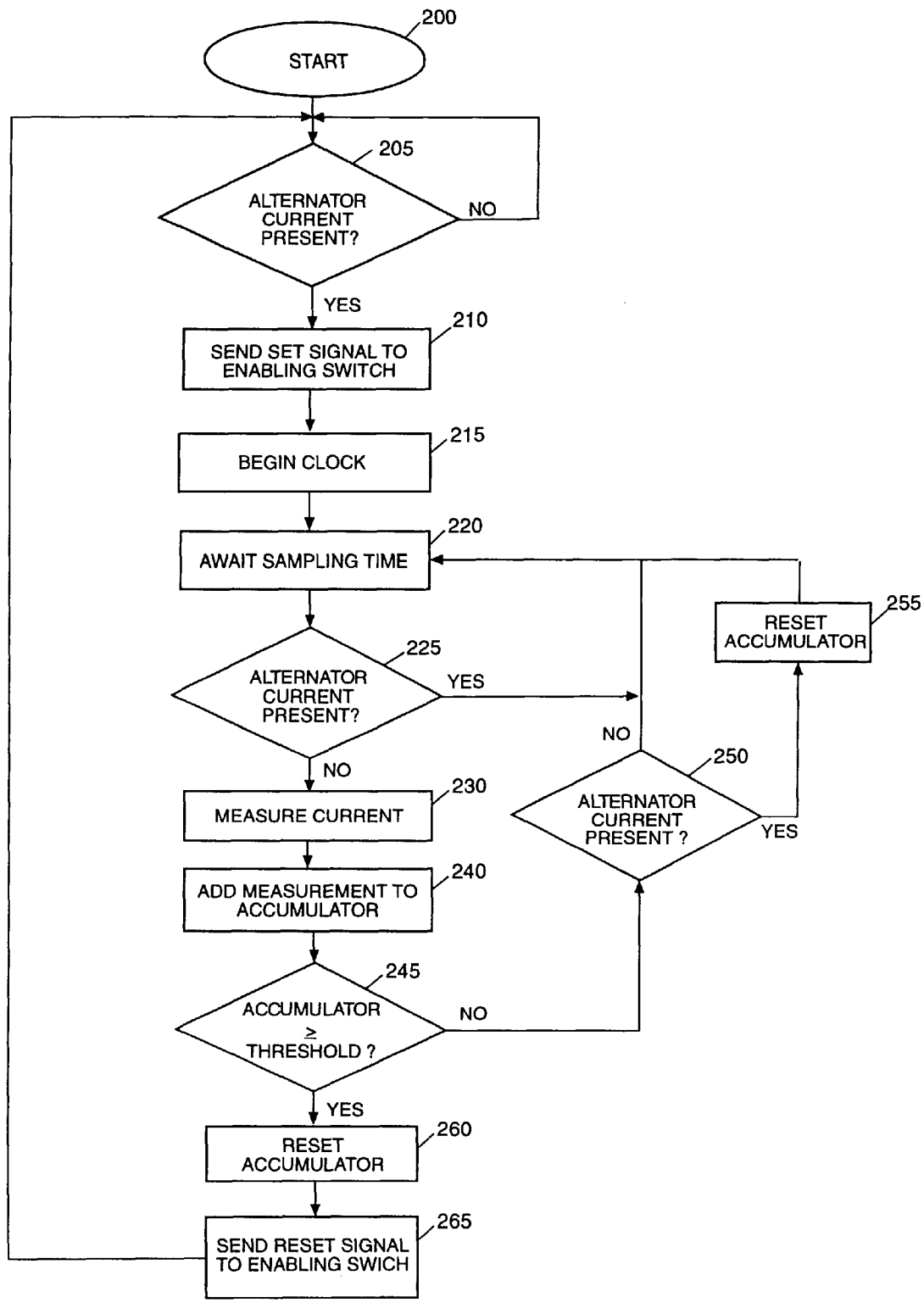
FIG. 3 is a flow diagram showing the logic used by the control unit of the battery-discharge-protection system

Now referring to FIG. 3, a flow diagram illustrates the operation of the control unit 40 of the battery-discharge-protection system 10. When the process starts (block 200) the enabling switch 30 is open and will not pass current to the telephone accessory 100. When a recharging current is sensed by the alternator current sensor 35 (block 205), the control unit 40 generates a set signal which closes the enabling switch 30, enables the flow of current to the telephone accessory 100 (block 210), and begins its internal clock (block 215). After starting its clock, the control unit 40 waits a predetermined time period (block 220) and then determines whether a recharging current is present (block 225). At this point, since the battery 70 is continuously recharged by the alternator 80, the control unit 40 loops continuously until the recharging current is no longer present.

When notified that a recharging current is not present, the control unit 40 begins to sample the current to the telephone accessory 100 via the accessory current sensor 20 at regular intervals of elapsed time indicated by the internal clock. When a clock signal is generated, the control unit 40 measures the current at the accessory current sensor 20 (block 230). The control unit 40 then adds the value of the current sample to the value stored in accumulator 45 (block 240). At this point, the control unit 40 compares the updated value now stored in the accumulator 45 to the threshold value, in other words the limit imposed on the extent to which the accessory 100 is permitted to discharge the battery (block 245).

If the value in the accumulator 45 is less than the threshold value and the control unit 40 has been notified by the alternator current sensor 35 that a recharging current is present (block 250), the control unit 40 resets the accumulator 45 (block 255). When the absence of a recharging current is again detected, the control unit 40 begins the current-measuring process anew (block 220). However, if the presence of a recharging current has not been detected since the preceding measurement (block 250), the control unit 40 awaits the next sampling time (block 220) without resetting the accumulator 45. Note that the second and any subsequently sampled values of current are added to the previous sum stored in the accumulator 45 (block 240). In addition, after each new sample has been added to the accumulator 45, the control unit 40 compares the cumulative stored value to the predetermined threshold value (block 245).

When the cumulative value stored in the accumulator 45 is equal to or greater than the threshold value (block 245), the control unit 40 resets the value in the accumulator to zero (block 260) and generates a reset signal (block 265) which opens the enabling switch 30 and interrupts power to the telephone accessory 100.

Figure 4:
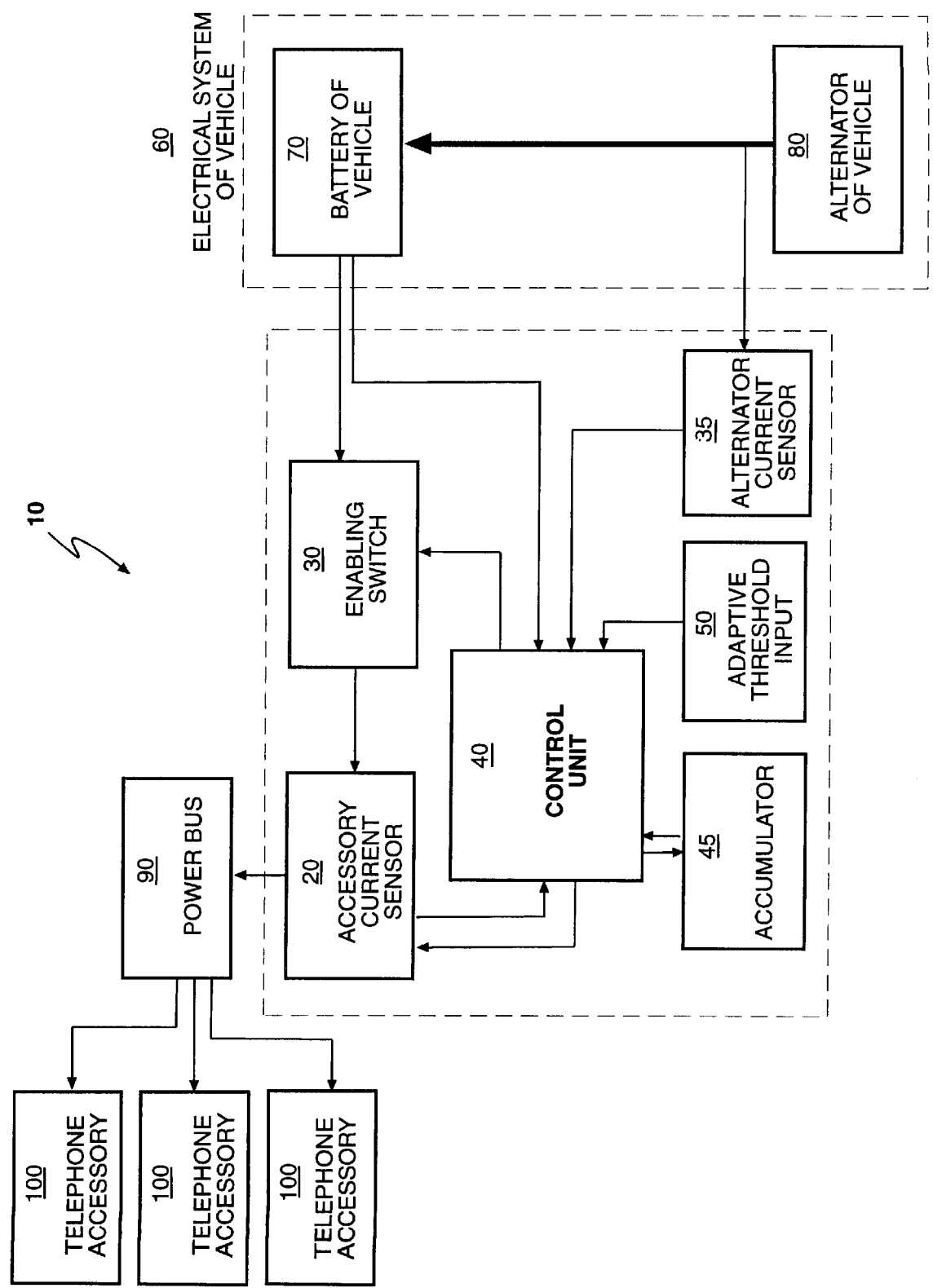
FIG. 4 is a block diagram of the present invention illustrating adaptation of the battery-discharge-protection system to include a power bus for facilitating operation of multiple telephone accessories and to include an adaptive threshold input for varying the amount by which the accessories are allowed to discharge the battery.

Now referring to FIG. 4, the system 10 described above is also adaptable to a vehicle containing a power bus 90. In this configuration, the power bus 90 is connected in series with the accessory current sensor 20 and the enabling switch 30 to the battery 70. The power bus 90 contains a plurality of connection points to accommodate multiple accessories 100. For example, a cellular telephone, a telephone answering machine, and a fax machine may all be connected to the power bus 90 in order that they may operate on power provided by the battery 70. Here, the system 10 measures the current to the power bus 90. Thus, the system 10 estimates the battery discharge from current measurements at the power bus 90 and the total discharge is independent of which telephone accessory 100 is operating. Note that this concept of a power bus 90 may extend to a situation where a plurality of telephone accessories 100 may be linked by a common power bus and command-and-control bus, wherein one of the accessories provides power to, and is the control center for, the remainder of the accessories. As long as the total current to these telephone accessories 100 may be measured or estimated, the system 10 is able to serve its intended purpose.

A further feature, shown in FIG. 4, which may be included with the battery-discharge-protection system 10 is an adaptive threshold input, designated by the numeral 50. The adaptive threshold input 50 provides a more precise means of controlling the amount of discharge which may be caused by the accessory(s) 100. The adaptive threshold input 50 may take several forms. For example, it is known that low ambient temperatures impedes the chemical reaction in the battery and effectively lowers the amount of power available from the battery. It is also known that many modern vehicles are equipped with a temperature measuring device which indicates the outside ambient temperature to the occupant of the vehicle. In this situation, the adaptive threshold input 50 would be connected to the temperature measuring device of the vehicle and would adjust the threshold value of allowed discharge of the battery 70 as a function of the outside ambient temperature. Further examples may include an adaptive threshold input 50 which compensates for the age of the battery 70, or which varies the threshold in accordance with the amount of recharge to the battery following a discharge cycle, or which sets a threshold based on actual measurement of the state of charge of the battery.

Figure 5:
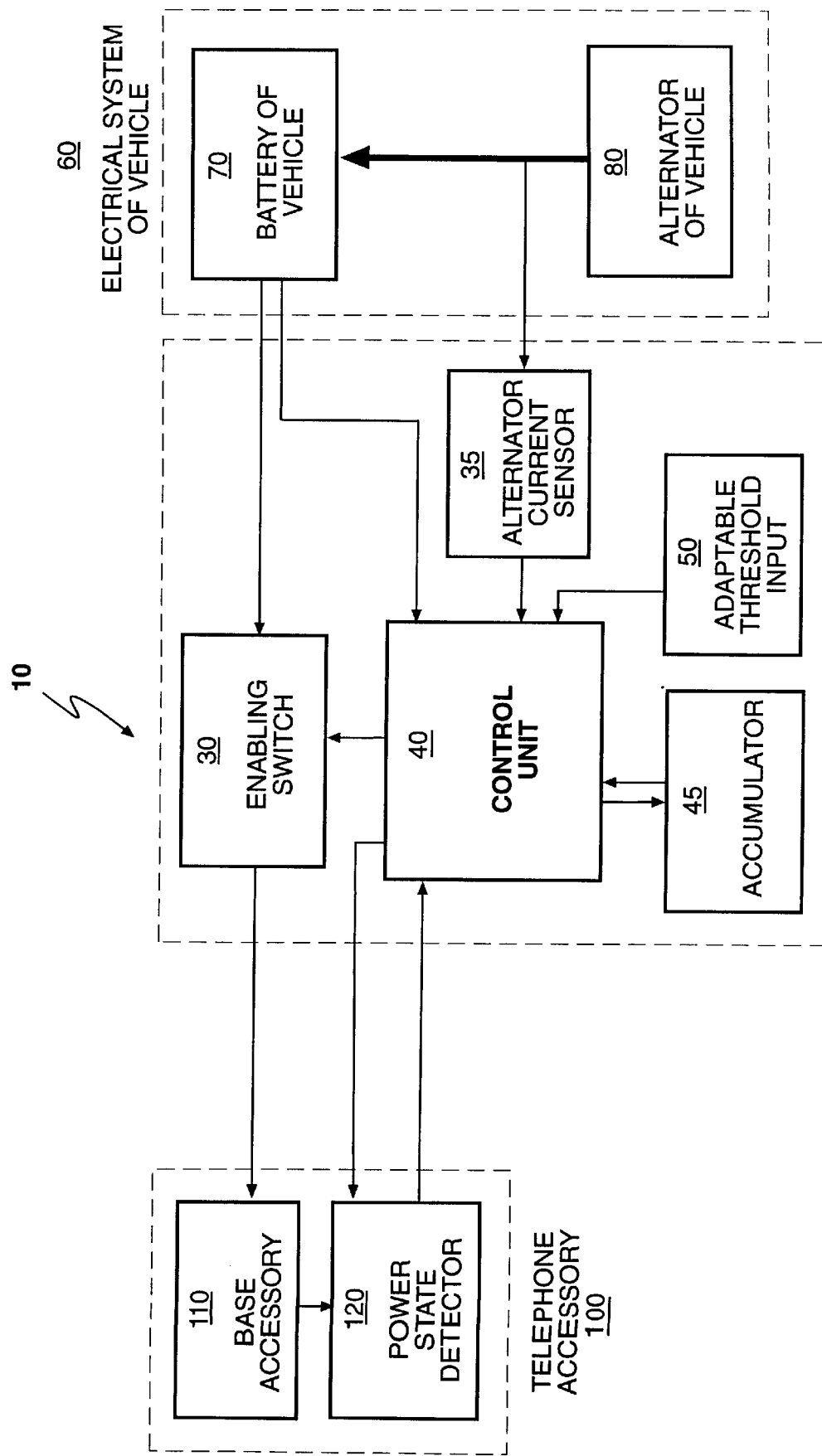
FIG. 5 is a block diagram of the present invention illustrating the adaptation of the battery-discharge-protection system to a telephone accessory where said accessory operates in discrete power states with known a priori power consumption.

It is also important to note that the configuration of the battery-discharge-protection system 10 as shown in FIGS. 1, 4, and 5 may itself take different forms. For instance, the system 10 may be contained Within the accessory 100, wherein wire connections would facilitate interaction with the electrical system of the vehicle 60. In a second form, the system 10 may be hard-wired into a cradle connected to the vehicle, wherein the cradle may be configured to accept a particular telephone accessory 100 or telephone accessories 100 in general. Alternatively, the system 10 may be a generic or specific adapter forming the interface between the accessory 100 and the electrical system of the vehicle 60. For example, the cradle/adapter containing the system 10 would connect through a port to the electrical system of the vehicle 60. At the same time, the cradle/adapter would be provided with either a receptacle for a cigarette lighter plug from the accessory 100 or a connector fitting the power input port of a specific accessory 100. In a third form, the system 10 is part of a common power and command-and-control bus linking a plurality of accessories 100 as described above. Further, in a fourth form, the system 10 may reside entirely within the electrical system of the vehicle 60 itself.

Now referring to FIG. 5, an alternate embodiment of the battery-discharge protection system 10 is shown wherein a portion of the system 10 is contained within the accessory 100 itself. In this configuration, the accessory 100 is known to operate in a specific number of discrete power states, wherein the energy consumption of the accessory 100 in each state is also known. Calculation of energy consumption is then simply a matter of detecting the power state in which the telephone accessory 100 is operating and the amount of time spent by the telephone accessory 100 in that power state. The total energy consumed is then calculated by summing the energy consumption in each of the operational states of the telephone accessory 100. Energy consumption is related to battery discharge by the battery's terminal voltage, which is assumed to remain approximately constant; therefore, in this embodiment, energy consumption is used as a proxy for discharge.

As an example of this concept, an AMPS cellular telephone operates under an RF-transmit-power-control algorithm, wherein the base station to which the phone is connected instructs the phone to adjust its RF level in accordance with the estimated RF link-loss. For a class III AMPS cellular telephone, seven distinct operational power states are available: (1) receive; (2) transmit at power levels 0, 1, or 2; (3) transmit at power level 3; (4) transmit at power level 4; (5) transmit at power level 5; (6) transmit at power level 6; (7) transmit at power level 7. In each of these operational power states, the telephone consumes energy at a different rate. Thus, under the power control algorithm, the energy consumption rate of the telephone in each state is known a priori. Therefore, the total energy consumed by the telephone can be computed by determining the operational state of the telephone and the amount of time spent by the telephone in each operational state.

As shown in FIG. 5, this configuration does not require an accessory current sensor 20 in the battery-discharge-protection system 10. The telephone accessory 100 is powered through a direct series connection with the enabling switch 30 to the battery 70. Here, the accessory 100 comprises the base accessory 110 and a power state detector 120. The power state detector 120 determines the operational state of the base accessory 110 and is connected to the control unit 40 of the system 10.

With this arrangement, the system 10 also performs periodic comparisons between the energy consumed by the telephone accessory 100 and the threshold. The comparison between the energy consumed and the threshold is triggered by a change in operational state or by a predetermined amount of time spent in a single power state. The control unit 40 performs the measurements and keeps a running total of the energy consumed by the accessory 100 in the accumulator 45. After each summation, the value in the accumulator 45 is compared to the threshold value. A reset signal is generated when the value in the accumulator 45 equals or exceeds the threshold value.

Figure 6:
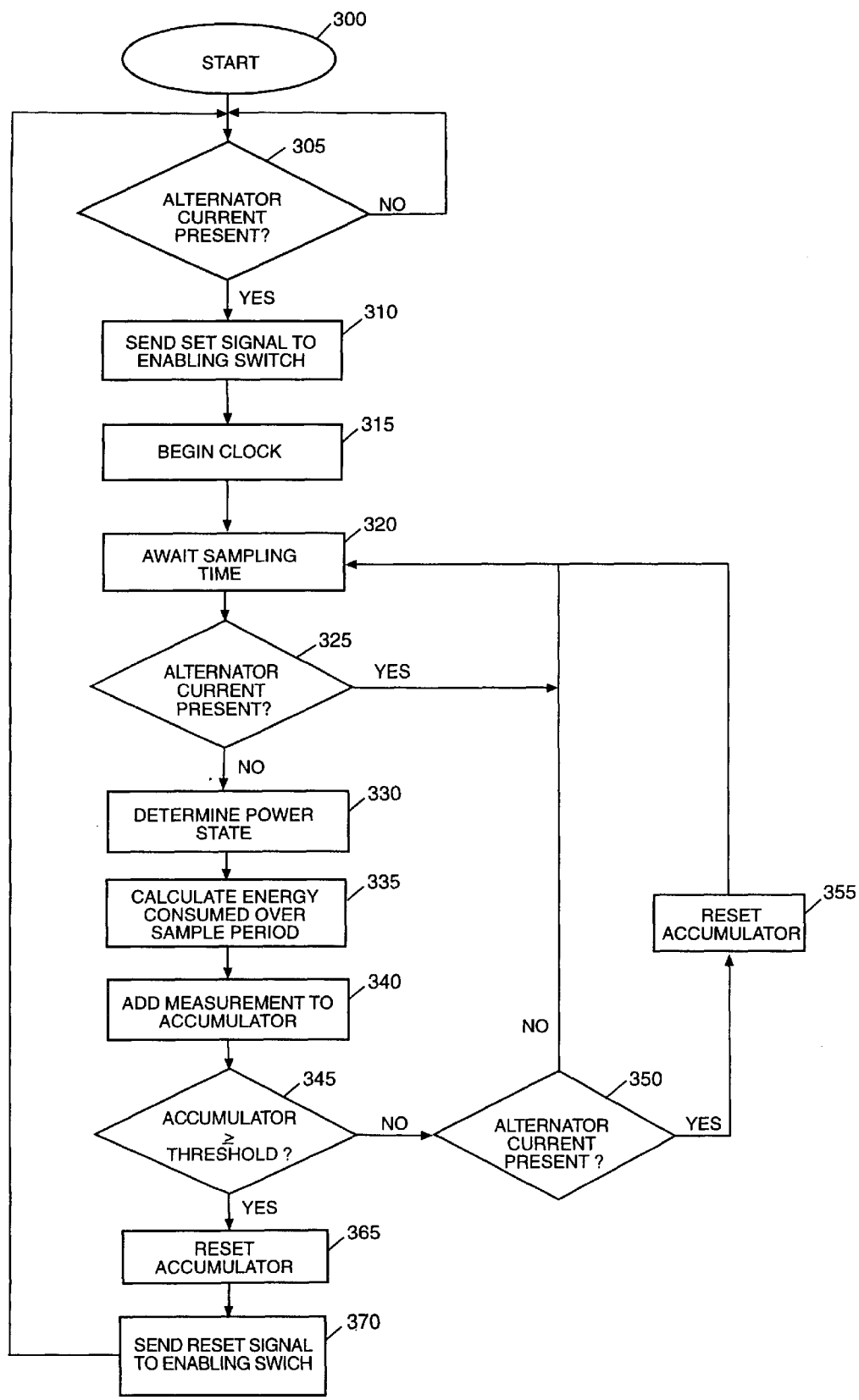
FIG. 6 is a flow diagram showing the logic used by the control unit where battery discharge is determined based on the power state of the accessory.

Now referring to FIG. 6, a flow diagram illustrates the operation of the control unit 40 of an alternate embodiment of the battery-discharge-protection system 10 as shown in FIG. 5. When the process starts (block 300) the enabling switch 30 is open and will not pass current to the telephone accessory 100. When a recharging current is sensed by the alternator current sensor 35 (block 305), the control unit 40 generates a set signal which closes the enabling switch 30, enables the flow of current to the telephone accessory 100 (block 310), and begins its internal clock (block 315). After starting its clock, the control unit 40 waits a predetermined time period (block 320) and then determines whether a recharging current is present (block 325). If a recharging current is present at this point, the control unit 40 loops continuously until the recharging current is no longer present since the battery 70 is continuously being recharged by the alternator 80 of the electrical system of the vehicle 60.

When notified that a recharging current is not present, the control unit 40 begins to monitor the power state of the device 100, via the power state detector 120 (block 330), at regular intervals of elapsed time indicated by the internal clock. When a clock signal is generated, the control unit 40 determines the power state of the device 100 (block 330). The control unit 40 then calculates the energy consumption over the sampling time period and adds the value to the value stored in accumulator 45 (block 340). At this point, the control unit 40 compares the updated value now stored in the accumulator 45 to the threshold value, in other words the limit imposed on the extent to which the accessory 100 is permitted to discharge the battery (block 345).

If the value in the accumulator 45 is less than the threshold value and the control unit 40 has been notified by the alternator current sensor 35 that a recharging current is present (block 350), the control unit 40 resets the accumulator 45 (block 355). When the absence a recharging current is again detected, the control unit 40 begins the power state computation process anew (block 320). However, if the presence of a recharging current has not been detected since the preceding measurement (block 350), the control unit 40 merely awaits the next sampling time (block 320) without resetting the accumulator 45. Note that the second and any subsequently sampled values of energy consumed are added to the previous sum stored in the accumulator 45 (block 340). In addition, after each new sample has been added to the accumulator 45, the control unit 40 compares the cumulative stored value to the predetermined threshold value (block 345).

When the cumulative value stored in the accumulator 45 is equal to or greater than the threshold value (block 345), the control unit 40 resets the value in the accumulator to zero (block 365) and generates a reset signal (block 370) which opens the enabling switch 30 and interrupts power to the telephone accessory 100.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended Claims are intended to be embraced therein.

What is claimed is:

1. A battery discharge protection system for a mobile telecommunications device powered by a battery, comprising:
   a) a power supply line connecting the telecommunications device to the battery;
   b) a control unit for monitoring the current consumed by said telecommunications device, said control unit including:
      i) an accessory current sensor for determining the current consumed by said telecommunications device in discrete intervals of time;
      ii) an accumulator for summing the current consumed by said telecommunications devices over a plurality of said time intervals to obtain a cumulative total of the current consumed;
      iii) means for generating a control signal when said total current consumed as indicated by said cumulative total reaches a threshold;
   c) a power switch disposed in said power supply line between the battery and the telecommunications device and operatively connected to said control unit, wherein said power switch is responsive to said control signal from said control unit to interrupt power to said telecommunications device.

2. The battery discharge protection system of claim 1 further including an alternator current sensor connected to an input of said control unit, said control unit being responsive to the alternator current sensor to begin monitoring the amount of current consumed when a recharging current is not present.

3. The battery discharge protection system of claim 1 wherein said control unit is contained within the telecommunications device.

4. The battery discharge protection system of claim 1 wherein said control unit is contained in an adapter connected to said telecommunications device.

5. The battery discharge protection system of claim 1 wherein said control unit is contained within a vehicle electrical system.

6. The battery discharge protection system of claim 1 further including a power bus for connecting a plurality of devices to said power supply line, wherein said control unit monitors the current flowing through said power bus.

7. The battery discharge protection system of claim 1 wherein said threshold is adaptively determined.

8. The battery discharge protection system of claim 7 wherein said threshold is adaptively determined as a function of ambient temperature.

9. The battery discharge protection system of claim 7 wherein said threshold is adaptively determined as a function of battery condition.

10. A battery discharge protection system for a mobile telecommunications device powered by a battery, comprising:
    a) a power supply line connecting the telecommunications device to the battery;
    b) a control unit for monitoring the battery discharge caused by said telecommunications device, said control unit including:
       i) an accessory current sensor for measuring current flowing to said telecommunications device over the power supply line at discrete intervals of time;
       ii) an accumulator for storing a cumulative total of the current consumed by said telecommunications device;
       iii) means for generating a control signal when the current consumed by said device as indicated by said cumulative total reaches a threshold;
    c) a power switch disposed in said power supply line between the battery and the telecommunications device and operatively connected to said control unit wherein said power switch is responsive to said control signal from said control unit to interrupt power to said telecommunications device.

11. The battery discharge protection system of claim 10 further including an alternator current sensor connected to an input of said control unit, said control unit being responsive to the alternator current sensor to begin monitoring the amount of current consumed when a recharging current is not present.

12. The battery discharge protection system of claim 10 wherein said control unit is contained within the telecommunications device.

13. The battery discharge protection system of claim 10 wherein said control unit is contained in an adapter connected to said telecommunications device.

14. The battery discharge protection system of claim 10 wherein said control unit is contained within a vehicle electrical system.

15. The battery discharge protection system of claim 10 further including a power bus for connecting a plurality of accessories to said power supply line, wherein said control unit monitors the current flowing through said power bus.

16. The battery discharge protection system of claim 10 wherein said threshold is adaptively determined.

17. The battery discharge protection system of claim 16 wherein said threshold is adaptively determined as a function of ambient temperature.

18. The battery discharge protection system of claim 16 wherein said threshold is adaptively determined as a function of battery condition.

19. A battery discharge protection system for a mobile telecommunications device powered by a battery, comprising:
    a) a power supply line connecting the mobile telecommunications device to the battery of a vehicle;

b) a control unit for monitoring the energy consumed by said mobile telecommunications device, said control unit including:
   i) a power state detector for determining the power state of said mobile telecommunications device;
   ii) a processor for calculating the energy consumed by said mobile telecommunications device in each power state;
   iii) an accumulator for maintaining a cumulative total of the energy consumed by said mobile telecommunication device;
   iv) means for generating a control signal when the total energy consumed as indicated by the cumulative total reaches a threshold;
c) a power switch disposed in said power supply line between the battery and the telecommunications device and operatively connected to said control unit, wherein said power switch is responsive to said control signal from said control unit to interrupt power to said telecommunications device.

20. The battery discharge protection system of claim 19 further including an alternator current sensor connected to an input of said control unit, said control unit being responsive to the alternator current sensor to begin monitoring the amount of energy consumed when a recharging current is not present.

21. The battery discharge protection system of claim 19 wherein said control unit is contained within the telecommunications device.

22. The battery discharge protection system of claim 19 wherein said control unit is contained in an adapter connected to said telecommunications device.

23. The battery discharge protection system of claim 19 wherein said control unit is contained within a vehicle electrical system.

24. The battery discharge protection system of claim 19 wherein said threshold is adaptively determined.

25. The battery discharge protection system of claim 24 wherein said threshold is adaptively determined as a function of ambient temperature.

26. The battery discharge protection system of claim 24 wherein, said threshold is adaptively determined as a function of battery condition.

27. A method for preventing a telecommunications device from deeply discharging a battery in a vehicle when the vehicle is not charging the battery, said method comprising:
   a) determining the current consumed by said telecommunications device in discrete intervals of time;
   b) summing the current consumed by said telecommunications device over a plurality of said time intervals to determine a cumulative total of the current consumed;
   c) periodically comparing said current consumed as indicated by said cumulative total to a threshold;
   d) interrupting power to said telecommunications device when the current consumed exceeds said threshold.

28. The method of claim 27 wherein the step of determining the current consumed by said telecommunications device includes sampling and accumulating the current to said telecommunications device.

29. The method of claim 27 wherein the step of determining the current consumed by said telecommunications device includes determining the power state of the telecommunications device, determining the amount of time said telecommunications device is in said power state, and computing the current consumed as a function of said power state and time.

30. The method according to claim 27 further including the step of adaptively determining the threshold.

31. The battery discharge protection system of claim 30 wherein said threshold is adaptively determined as a function of ambient temperature.

32. The battery discharge protection system of claim 30 wherein said threshold is adaptively determined as a function of battery condition.

* * * * *